(12) United States Patent
Kawashima

(10) Patent No.: US 8,669,740 B2
(45) Date of Patent: Mar. 11, 2014

(54) VEHICLE CHARGING SYSTEM

(75) Inventor: Kiyotaka Kawashima, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/881,839

(22) PCT Filed: Dec. 28, 2011

(86) PCT No.: PCT/JP2011/080412
§ 371 (c)(1),
(2), (4) Date: Apr. 26, 2013

(87) PCT Pub. No.: WO2012/098819
PCT Pub. Date: Jul. 26, 2012

(65) Prior Publication Data
US 2013/0207608 A1      Aug. 15, 2013

(30) Foreign Application Priority Data

Jan. 19, 2011  (JP) ................................. 2011-008697

(51) Int. Cl.
*H02J 7/00*       (2006.01)
*B60K 1/00*      (2006.01)

(52) U.S. Cl.
USPC ........................... 320/109; 180/65.1; 903/903

(58) Field of Classification Search
USPC ....................................................... 320/109
See application file for complete search history.

(56) References Cited

U.S. PATENT DOCUMENTS

| | | | |
|---|---|---|---|
| 2011/0043165 A1* | 2/2011 | Kinser et al. | 320/109 |
| 2012/0098490 A1* | 4/2012 | Masuda | 320/109 |
| 2013/0221918 A1* | 8/2013 | Hill et al. | 320/109 |

FOREIGN PATENT DOCUMENTS

| | | |
|---|---|---|
| CN | 101165990 A | 4/2008 |
| CN | 101909928 A | 12/2010 |
| JP | 3552586 B2 | 5/2004 |
| JP | 2008-136291 A | 6/2008 |
| JP | 2009-100569 A | 5/2009 |
| JP | 2009-171733 A | 7/2009 |
| JP | 2010-4674 A | 1/2010 |
| JP | 2010-110050 A | 5/2010 |
| JP | 2010-200530 A | 9/2010 |
| JP | 2010-252449 A | 11/2010 |

OTHER PUBLICATIONS

International Search Report dated Apr. 24, 2012 corresponding to International Patent Application No. PCT/JP2011/080412.
First Office Action dated Oct. 17, 2013 corresponding to Chinese Patent Application No. 201180051129.X and English translation thereof.

* cited by examiner

*Primary Examiner* — Drew A Dunn
*Assistant Examiner* — Nathaniel Pelton
(74) *Attorney, Agent, or Firm* — Squire Sanders (US) LLP

(57) ABSTRACT

A vehicle charging system includes: a vehicle (14) provided with a battery (13) and a charging control unit (53); an external power source (11); a charging cable (12) provided with an electric power line (12L) and a first communication control unit (33); an external power source line (11L); a second communication control unit (24); a consumed power acquiring unit (23) acquiring consumed power (PIF); a charging-allowable power calculating unit (23) calculating charging-allowable power (PEV), and transmitting unit (43) and a control unit (34) provided at the charging cable.

1 Claim, 7 Drawing Sheets

VEHICLE CHARGING SYSTEM

BACKGROUND OF THE INVENTION

1. Field of the Invention

The present invention relates to a vehicle charging system.

This application claims priority from Japanese Patent Application No. 2011-008697 filed on Jan. 19, 2011, the contents of which are incorporated herein by reference in their entirety.

2. Background Art

Conventionally, as charging cables used for charging a battery of an electric vehicle from a power source (external power source) provided outside a vehicle such as an alternating-current source used for household or the like, charging cables are well-known in which a period of charging time or charging start time can be determined or charging mode can be switched (for example, refer to Japanese Unexamined Patent Application, First Publication No. 2009-100569).

Additionally, a charging control apparatus is conventionally known in which pilot signals output from an oscillator provided inside an electric power cable are used for, for example, a signal indicating activation of a vehicle charging system (for example, refer to Japanese Unexamined Patent Application, First Publication No. 2009-171733).

However, the above-described conventional charging cable or electric power cable is provided with a charging circuit interrupt device (CCID) that detects a connection state between a charging cable and a vehicle charging system, that interrupts the connection between an external power source and a vehicle charging system when overcurrent or leaking of electrical current is generated, or the like.

Consequently, activation of the vehicle charging system is controlled by control pilot signals (CPL signal: Control Pilot Line signal) output from the charging circuit interrupt device.

However, according to the aforementioned conventional charging cable or the electric power cable, the interrupting current value of the charging circuit interrupt device is only determined in accordance with the interrupting current value of a relay or the like provided at the charging circuit interrupt device, and the interrupting current value is not reflected to the allowable electric power that the external power source can supply.

Because of this, in the external power source such as an alternating-current source used for household or the like, in which, for example, the allowable electric power which can be supplied by the external power source varies depending on consumed power in a house, there is a concern that an amount of the electric power exceeding the amount of the allowable electric power which can be supplied is extracted as charging power from the external power source.

In this case, there is a concern that the electric power supplied from the external power source inclusively power feeding in home is broken by a current limiter (or breaker) provided at the external power source.

As a countermeasure against the foregoing problems, for example, when the breaking current value of the external power source is made sufficiently-high, there is a problem in that required cost of device constitution or required cost of consumption of electric power increases.

SUMMARY OF THE INVENTION

The invention was conceived in view of the above-described circumstances and it is an object thereof to provide a vehicle charging system which can adequately charge a battery of a vehicle in accordance with electric power which can be supplied by the external power source.

In order to solve the aforementioned problem and achieve the above-described object, a vehicle charging system of a first aspect of the invention includes: a vehicle comprising a charging control unit controlling a battery and charge of the battery; an external power source provided outside the vehicle; a charging cable comprising an electric power line and a first communication control unit, the electric power line connecting the external power source to the vehicle such that the external power source and the vehicle transmit and receive electric power, the first communication control unit being connected to the electric power line; an external power source line provided at the external power source and being connectable to the electric power line of the charging cable; a second communication control unit provided at the external power source and connected to the external power source line, being capable of communicating the first communication control unit due to power line communication through the electric power line and the external power source line; a consumed power acquiring unit provided at the external power source, acquiring consumed power to be consumed in the external power source other than the charge of the battery of the vehicle; a charging-allowable power calculating unit provided at the external power source, the external power source being capable of supplying maximum supplied power, the charging-allowable power calculating charging-allowable power obtained by subtracting the consumed power from the maximum supplied power; a transmitting unit provided at the charging cable, the transmitting unit transmitting information associated with the charging-allowable power, and the information being received by the first communication control unit to the charging control unit of the vehicle; and a control unit provided at the charging cable, supplying electric power from the external power source to the battery of the vehicle based on the information associated with the charging-allowable power, the information being received by the first communication control unit, the second communication control unit transmits the first communication control unit information associated with the charging-allowable power through the power line communication, and the first communication control unit receives information which is associated with the charging-allowable power and transmitted from the second communication control unit.

The second communication control unit transmits the first communication control unit information associated with the charging-allowable power through the power line communication, and the first communication control unit receives information which is associated with the charging-allowable power and transmitted from the second communication control unit.

In a vehicle charging system of a second aspect of the invention, the charging cable is provided with a display unit, and the control unit calculates maximum charging electrical current and charge completion time based on the information of the charging-allowable power received by the first communication control unit and displays the calculation result on the display unit.

Effects of the Invention

According to the vehicle charging system of the first aspect of the invention, the first communication control unit of the charging cable can communicate with the second communication control unit of the external power source through the power line communication.

Consequently, since the control unit of the charging cable supplies the electric power to the battery of the vehicle based on the information associated with the charging-allowable power obtained from the external power source by the power line communication, it is possible to perform adequate charge.

That is, the control unit of the charging cable extracts the power which is charged to the battery of the vehicle in the range of the electric power lower than the charging-allowable power obtained from the external power source.

For this reason, it is possible to prevent the external power source from extracting an amount of electric power which exceeds the amount of electric power which can be supplied by the external power source to the battery. It is possible to prevent a current limiter (or breaker or the like) of the external power source from being operated when charging the battery.

According to the vehicle charging system of the second aspect of the invention, based on the information of the charging-allowable power obtained from the external power source, the degree of accuracy of calculating the maximum charging electrical current and the charging completion time can be improved, and it is possible to improve usability.

DESCRIPTION OF THE PREFERRED EMBODIMENTS

Hereinafter, a vehicle charging system related to an embodiment of the invention will be described with reference to attached drawings.

Figure 1:
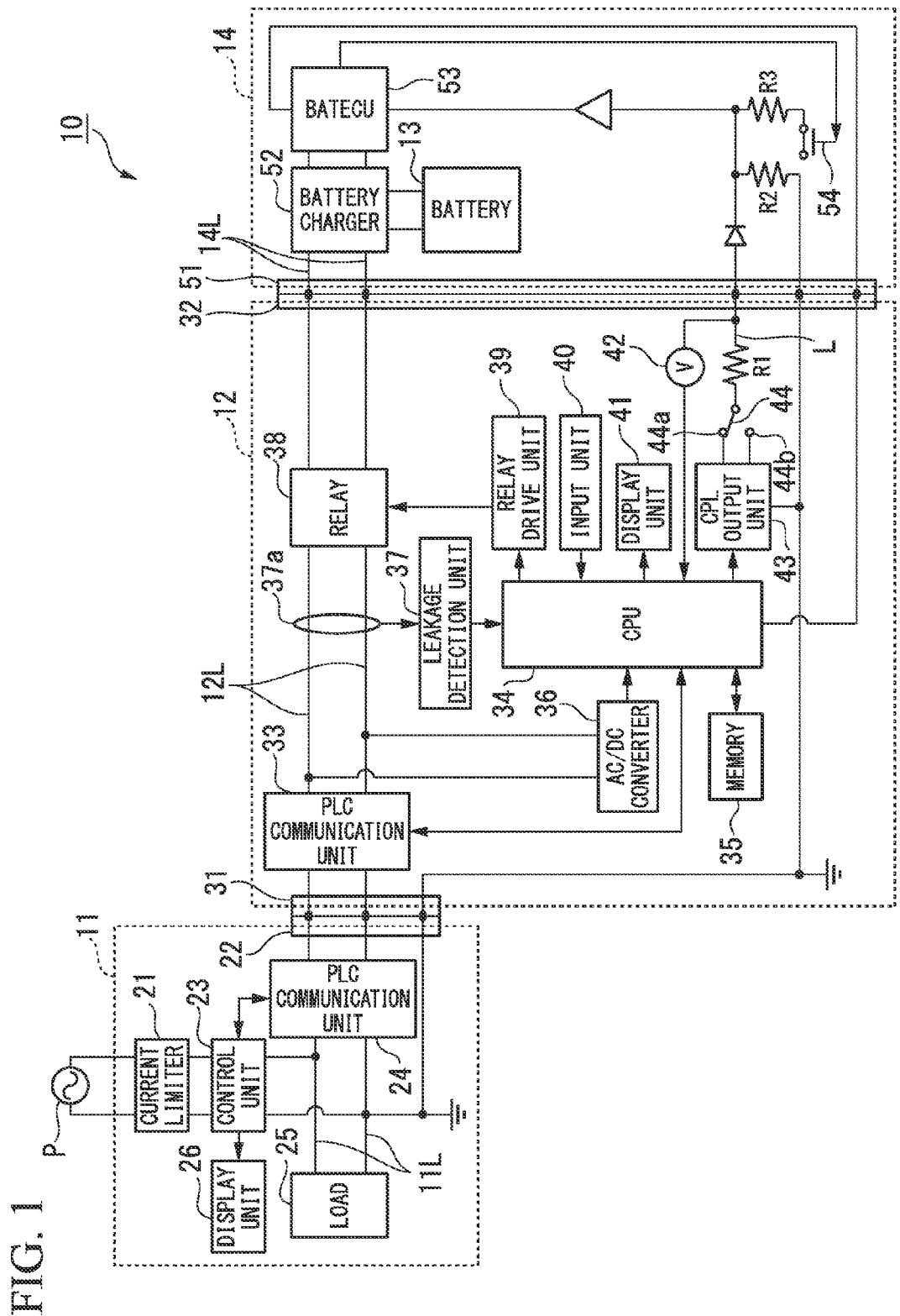
FIG. 1 is a block diagram illustrating a vehicle charging system related to embodiment of the invention.

As shown in, for example, FIG. 1, a vehicle charging system 10 of the embodiment includes an external power source 11 constituted of a power supply for use by the household or the like, a charging cable 12, and a vehicle 14 provided with a battery 13.

Additionally, the external power source 11 is connected to the battery 13 of the vehicle 14 by the charging cable 12.

The vehicle charging system 10 is a plug-in type vehicle charging system capable of charging the battery 13 of the vehicle 14 by use of electric power supplied from the external power source 11.

The external power source 11 is configured to include, for example, a current limiter 21, an outlet 22, a control unit 23 (consumed power acquiring unit, charging-allowable power calculating unit), a PLC communication unit 24 (second communication control unit), load 25 such as various household electrical appliances or the like, and a display unit 26 such as liquid crystal display device or the like.

The current limiter 21 is connected to an outside power supply P such as an electric power company or the like. The current limiter 21 breaks the electrical current exceeding a predetermined electrical current which is contract demand that a customer having the external power source 11 contracts in advance. The current limiter 21 breaks abnormal excessive electrical current flowing to the load 25 which is power consumption by the customer.

The outlet 22 is connectable to a plug 31 of the charging cable 12, and the outlet 22 connects the external power source 11 to the charging cable 12 such that the external power source 11 and the charging cable 12 transmit and receive the electric power.

The control unit 23 obtains various information related to power consumption in the external power source 11 and controls the display unit 26 and the PLC communication unit 24 based on such information.

The control unit 23 obtains, for example, consumed power PIF which is the consumed power in the load 25 (i.e., the consumed power PIF is consumed power except the power consumed for charging the battery 13 of the vehicle 14 as described below), and the control unit 23 displays the consumed power PIF on the display unit 26.

Moreover, the control unit 23 obtains, for example, the maximum supplied power PMAX which can be supplied by the external power source 11 (that is, maximum supplied power which can be supplied from the current limiter 21 of the external power source 11), and the control unit 23 calculates charging-allowable power PEV (information associated with the charging-allowable power) which is obtained by subtracting the consumed power PIF from the maximum supplied power PMAX.

Furthermore, the control unit 23 obtains information related to allowable electric power PCCID from the charging cable 12 by the power line communication through the PLC communication unit 24, and the control unit 23 finally determines the charging-allowable power PEV by comparing the allowable electric power PCCID with the charging-allowable power PEV.

Consequently, the control unit 23 transmits the information related to the charging-allowable power PEV from the PLC communication unit 24 to the charging cable 12.

Additionally, for example, the control unit 23 calculates a charging current ICHG (information which is associated with the charging-allowable power) in accordance with the charging-allowable power PEV and the power source voltage VAC of the external power source 11, and transmits the information of the charging current ICHG to the charging cable 12 from the PLC communication unit 24.

In addition, for example, the control unit 23 predicts demand for power (predicted value of demand for power) necessary to be used on or after the present time, based on information associated with an appointment for operation which is previously determined in the load 25 or information associated with variation in the consumed power PIF which is obtained in accordance with time elapsed in previous cases, in addition to acquiring the value (present value) of the consumed power PIF which is consumed at the load 25 at the present time. The control unit 23 transmits the information of the predicted value of demand for power from the PLC communication unit 24 to the charging cable 12.

The PLC communication unit 24 of the external power source 11 is connected to an electric power line (external power source line 110 of the external power source 11.

The communication unit 24 can communicate with a PLC communication unit 33 (first communication control unit) of the charging cable 12 which will be described later by the power line communication through an electric power line 12L of the external power source line 11L and the charging cable 12.

Particularly, the PLC communication unit 24 of the external power source 11 and the PLC communication unit 33 of the charging cable 12 multiplex an electric power signal and a signal of various information and transmit the external power source line 11L and the electric power line 12L of the charging cable 12.

The charging cable 12 is configured to include, for example, the plug 31 connectable to an outlet 22 of the external power source 11, a vehicle-side plug 32, the PLC communication unit 33, a CPU (Central Processing Unit, control unit) 34, a memory 35, an AC/DC converter 36, a leakage detection unit 37, a relay 38, a relay drive unit 39, an input unit 40, a display unit 41, a voltage sensor 42, a CPL output unit 43 (transmitting unit), and a changing-over switch 44.

The vehicle-side plug 32 is connectable to a plug-in connector 51 of the vehicle 14, and connects the charging cable 12 to the battery 13 of the vehicle such that the charging cable 12 and the battery 13 transmit and receive the electric power.

The PLC communication unit 33 is connected to the electric power line 12L of the charging cable 12, and can communicate with the PLC communication unit 24 of the external power source 11 by the power line communication through the electric power line 12L and the external power source line 11L of the external power source 11.

The CPU 34 comprehensively controls the charging of the battery 13 of the vehicle 14 by use of the charging cable 12.

The memory 35 in which a variety of data is stored is connected to the CPU 34, and a direct-current power is supplied to the memory 35 from the AC/DC converter 36 converting alternating-current power supplied from the external power source 11 into direct-current power.

For example, based on a detected signal output from a current sensor 37a detecting the electrical current flowing in the electric power line 12L, the CPU 34 controls the operation of the relay drive unit 39 driving the relay 38 in accordance with the signal indicating the detected result output from the leakage detection unit 37 detecting the presence or absence of electrical leakage.

Particularly, when a generation of electrical leakage is detected by the leakage detection unit 37, the CPU 34 operates the relay 38 so as to be turned off and instructs the relay drive unit 39 to intercept the electrical current of the electric power line 12L.

Additionally, in the case where the voltage of the CPL signal detected by the voltage sensor 42 which will be described later is a predetermined third voltage V3 before the start of charging the battery 13, the CPU 34 operates the relay 38 so as to be turned on and starts to charge the battery 13 of the vehicle 14 by applying the electrical current of the electric power line 12L thereto.

Furthermore, in the case where the voltage of the CPL signal detected by the voltage sensor 42 which will be described later is a predetermined second voltage V2 after the start of charging the battery 13, the CPU 34 operates the relay 38 so as to be turned off, intercepts the electrical current of the electric power line 12L, and stops the charging of the battery 13 of the vehicle 14.

In other cases, the CPU 34 can instruct to execute a variety of control operations depending on the signal output from the input unit 40 which is configured to include a switch, a button, or the like, which can be operated by, for example, an operator.

Moreover, the CPU 34 obtains various information related to the charging of the battery 13 of the vehicle 14 by use of the external power source 11, and displays this information on the display unit 41.

For example, the CPU 34 obtains the information of the charging-allowable power PEV, which is transmitted from the PLC communication unit 24 of the external power source 11 through the power line communication, by use of the PLC communication unit 33, and calculates a maximum charging electrical current ICHGM based on a charging voltage VEV which is to be applied to the vehicle-side plug 32.

Furthermore, maximum charging power PCHGM is calculated based on the maximum charging electrical current ICHGM and the power source voltage VAC of the external power source 11, and the maximum charging power PCHGM and the maximum charging electrical current ICHGM are displayed on the display unit 41.

Additionally, the CPU 34 obtains, for example, the information related to the predicted value of demand for power, which is transmitted from the PLC communication unit 24 of the external power source 11 by the power line communication, through the PLC communication unit 33.

In addition, the CPU 34 acquires information of electrical energy requirement U from a BATECU 53 (charging control unit) of the vehicle 14, calculates charge completion time TE based on the predicted value of demand for power of the external power source 11 and the electrical energy requirement U of the vehicle 14, and displays the charge completion time TE on the display unit 41.

Moreover, the CPU 34 controls the CPL output unit 43, for example, based on the signal output from the voltage sensor 42 detecting the voltage of the CPL signal which is output from the CPL output unit 43 to a control pilot (CPL: Control Pilot Line) communication line L provided between the charging cable 12 and the vehicle 14.

Particularly, the CPL output unit 43 is provided with two terminals 44a, 44b.

An oscillated signal of the CPL signal is output from one terminal 44a (first terminal), and a constant-voltage signal is output from the other of terminal 44b (second terminal).

Consequently, the changing-over switch 44 selects one of two terminals 44a and 44b due to the control of the CPU 34, and connects an electrical resistance R1 to a CPL communication line L.

For example, the CPU 34 obtains the information of the charging current ICHG which is transmitted from the PLC communication unit 24 of the external power source 11 by the power line communication through the PLC communication unit 33.

Furthermore, the CPU 34 transmits the CPL signal (oscillated signal) having a pulse width indicating the size of the charging current ICHG from the CPL output unit 43 to the BATECU 53 of the vehicle 14.

The vehicle 14 is configured to include, for example, a battery 13 such as a lithium-ion secondary battery or the like, which can be repeatedly used for charging, the plug-in connector 51 connectable to the vehicle-side plug 32 of the charging cable 12, a battery charger 52, the BATECU 53 serving as an ECU (Electronic Control Unit) constituted of an electronic circuit such as a CPU or the like, and a switch 54.

The battery charger 52 is connected to the plug-in connector 51 via an electric power line 14L of the vehicle 14 and provided with an inverter or the like converting alternating-current power, which is supplied from, for example, the external power source 11 through the charging cable 12, into direct-current power.

Additionally, the battery charger 52 charges the battery 13 by the electric power supplied from the external power source 11 in accordance with the control of the BATECU 53.

The BATECU 53 detects, for example, a charging state of the battery 13.

The BATECU 53 controls the charging of the battery 13 by controlling the operation of the battery charger 52 and the switch 54 based on the detection result and the CPL signal transmitted from the charging cable 12.

In the case where, for example, the CPL signal (oscillated signal) having a pulse width indicating the size of the charging current ICHG is received from the charging cable 12 through the CPL communication line L, the BATECU 53 outputs a command signal for charging to the switch 54 and operates the switch 54 so as to be turned on.

Furthermore, the BATECU 53 sets an input current limit value of the battery charger 52 to be the value corresponding to the duty ratio of the CPL signal so as to supply the charging current in accordance with the duty ratio (pulse width) of the CPL signal to the battery 13.

Moreover, for example, in the case where the BATECU 53 detects that the charging state of the battery 13 reaches a full charge state or the like, the BATECU 53 outputs a command signal for stopping the charge to the switch 54 and operates the switch 54 so as to be turned off.

The switch 54 turns on in accordance with, for example, the command signal for charging, which is output from the BATECU 53, and the switch 54 connects the CPL communication line L provided between the charging cable 12 and the vehicle 14 to two electrical resistances R2 and R3.

Moreover, the switch 54 turns off in accordance with, for example, the command signal for stopping the charge, and the switch 54 intercepts the connection of the electrical resistance R3 with respect to the CPL communication line L.

In other cases, the BATECU 53 of the vehicle 14 and the CPU 34 of the charging cable 12 can transmit and receive data to each other by, for example, serial communication or the like.

The vehicle charging system 10 of the embodiment is provided with the aforementioned constitution. Next, an operation of the vehicle charging system 10, particularly, an operation of charging the battery 13 of the vehicle 14 by utilizing the electric power supplied from the external power source 11 will be described.

Firstly, a main operation of charging by use of the charging cable 12 will be described.

Figure 2:
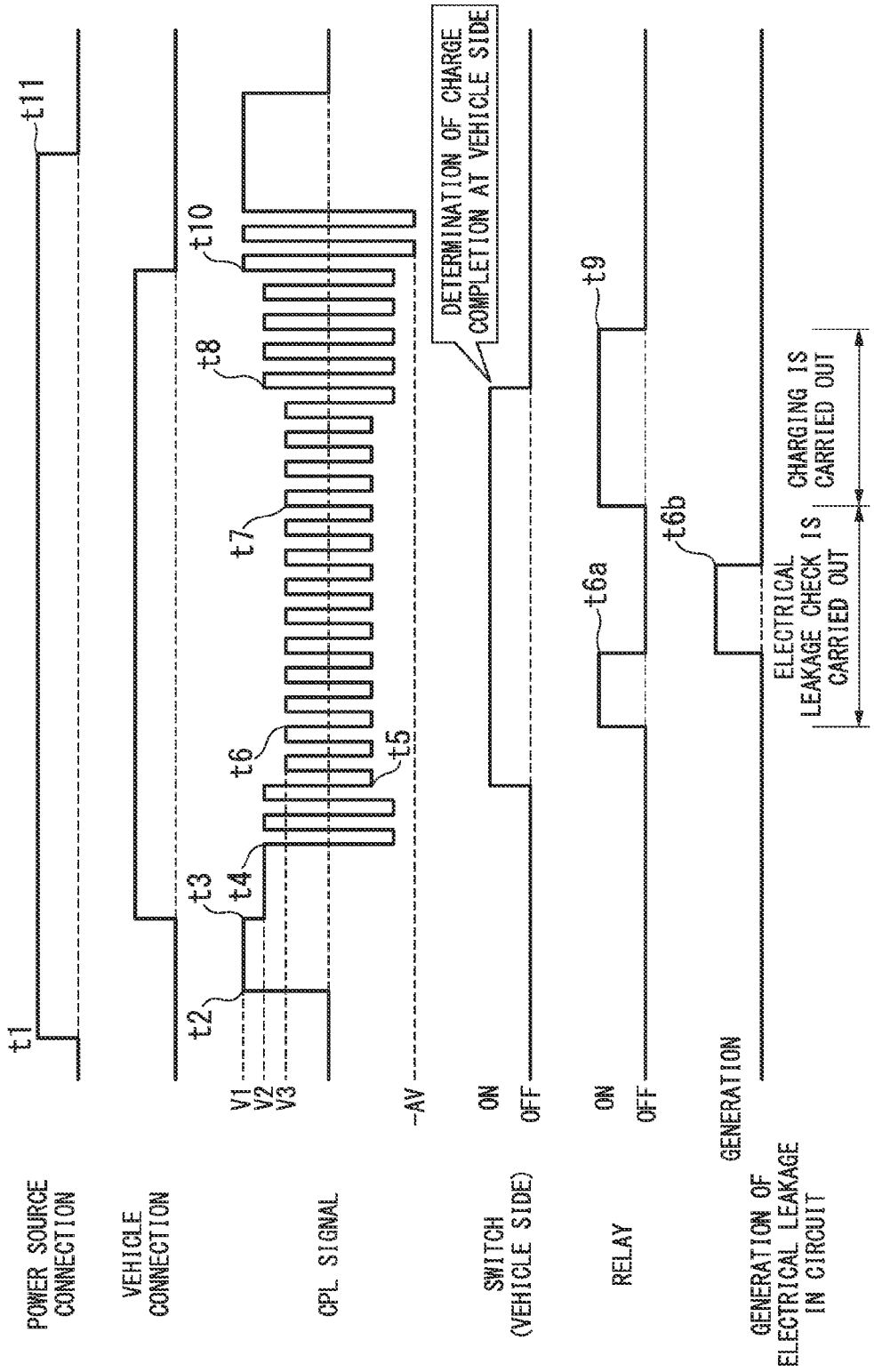
FIG. 2 is a timing chart illustrating an example of a charging operation by use of a charging cable of the vehicle charging system related to an embodiment of the invention.

For example, at time t1 as shown in FIG. 2, when an operator inserts the outlet 22 of the external power source 11 into the plug 31 of the charging cable 12 and the charging cable 12 is thereby connected to a power supply P of the external power source 11 (power source connection), predetermined processes such as initial setup of the memory 35 or the like are executed.

Consequently, for example, at time t2 as shown in FIG. 2, the changing-over switch 44 connected to the other terminal 44b of the CPL output unit 43, and a signal of a predetermined first voltage V1 which is not oscillated is output to the CPL communication line L.

Subsequently, for example, at time t3 as shown in FIG. 2, when the operator inserts the vehicle-side plug 32 of the charging cable 12 into the plug-in connector 51 of the vehicle 14 and the charging cable 12 is thereby connected to the vehicle 14 (vehicle connection), the voltage of a signal output from the other terminal 44b of the CPL output unit 43 changes from a first voltage V1 to a second voltage V2 representing a partial voltage of the electrical resistance R1 and the electrical resistance R2.

Consequently, for example, at time t4 as shown in FIG. 2, when a change in the voltage is detected by the voltage sensor 42, the changing-over switch 44 is connected to one terminal 44a of the CPL output unit 43, and the CPL signal (oscillated signal) of the second voltage V2 is output to the CPL communication line L.

Next, for example, at time t5 as shown in FIG. 2, when a command signal for charging is output from the BATECU 53 to the switch 54 in accordance with the CPL signal (oscillated signal), the switch 54 is turned on, and the voltage of the CPL signal (oscillated signal) changes from the second voltage V2 to a third voltage V3 representing a partial voltage of the electrical resistance R1, the electrical resistance R2, and the electrical resistance R3.

Consequently, when the change in the voltage is detected by the voltage sensor 42, after the presence or absence of electrical leakage is detected by the leakage detection unit 37, for example, in the period between times t6 to t7 as shown in FIG. 2, the relay 38 is operated so as to be turned on, for example, on or after time t7, the charging of the battery 13 of the vehicle 14 is started.

In other cases, when the presence or absence of electrical leakage is detected, the relay 38 is operated so as to be turned on. When electrical leakage is generated such as in the period between times t6a to t6b as shown in FIG. 2, the relay 38 is switched and operated so as to be turned off.

Consequently, when the command signal for stopping the charge is output from the BATECU 53 to the switch 54 for example, at time t8 as shown in FIG. 2, the switch 54 is turned off, the voltage of the CPL signal (oscillated signal) changes from the third voltage V3 to the second voltage V2.

After that, for example, at time t9 as shown in FIG. 2, the change in the voltage is detected by the voltage sensor 42, the relay 38 is operated so as to be turned off, and the charging of the battery 13 of the vehicle 14 is stopped.

Consequently, for example, at time t10 as shown in FIG. 2, the operator removes the vehicle-side plug 32 of the charging cable 12 from the plug-in connector 51 of the vehicle 14 and the connection between the charging cable 12 and the vehicle 14 is thereby released, the voltage of the signal output from the other terminal 44b of the CPL output unit 43 changes from the second voltage V2 representing a partial voltage of the electrical resistance R1 and the electrical resistance R2 to the first voltage V1.

Next, for example, at time t11 as shown in FIG. 2, the operator removes the plug 31 of the charging cable 12 from the outlet 22 of the external power source 11, the connection between the charging cable 12 and the power supply P of the external power source 11 is thereby released.

Hereinafter, an operation of the control unit 23 of the external power source 11 after the external power source 11 is connected to the vehicle 14 by use of the charging cable 12 will be described.

Figure 3:
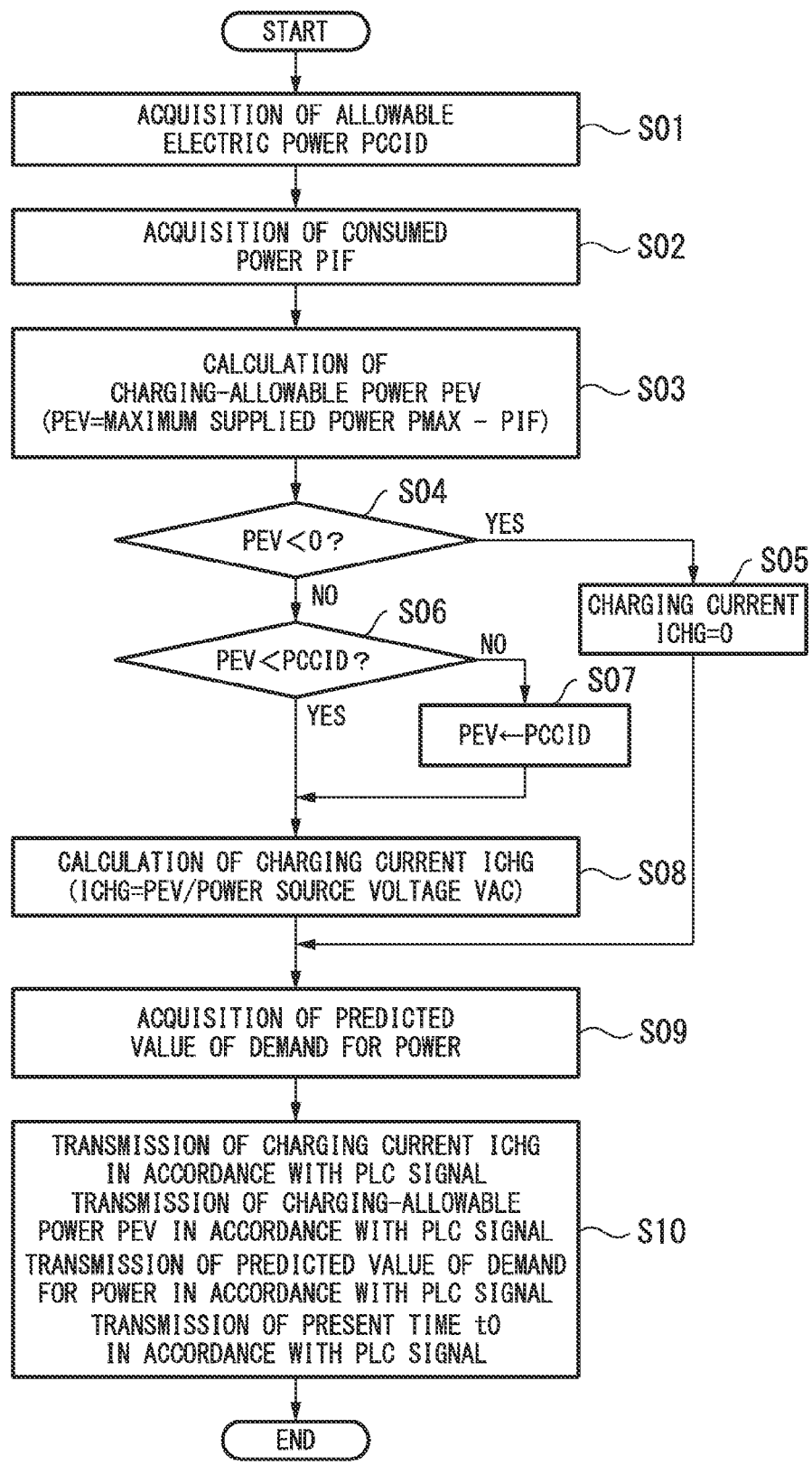
FIG. 3 is a flowchart illustrating an operation of an external power source of the vehicle charging system related to the embodiment of the invention.

First of all, for example, in step S01 as shown in FIG. 3, information of allowable electric power PCCID is obtained from the charging cable 12 through power line communication.

Subsequently, at step S02, the consumed power PIF which is consumed in the load 25, that is, the consumed power other than the charging of the battery 13 of the vehicle 14 is acquired.

Next, at step S03, the maximum supplied power PMAX which can be supplied by the external power source 11 (i.e., maximum supplied power which can be supplied by the current limiter 21 of the external power source 11) is obtained, and charging-allowable power PEV (=PMAX−PIF) is calculated by subtracting the consumed power PIF from the maximum supplied power PMAX.

After that, at step S04, it is determined as to whether or not the charging-allowable power PEV is less than zero.

If the determined result is "YES", the process proceeds to step S05. In the step S05, the charging current ICHG is zero, and the process proceeds to step S09 which will be described later.

On the other hand, if the determined result is "NO", the process proceeds to step S06.

Consequently, in the step S06, it is determined as to whether or not the charging-allowable power PEV is less than the allowable electric power PCCID.

If the determined result "YES", the process proceeds to step S08.

On the other hand, if the determined result is "NO", the process proceeds to step S07. In the step S07, the allowable electric power PCCID is freshly set as a charging-allowable power PEV, and the process proceeds to step S08.

Consequently, in the step S08, the charging current ICHG (=PEV/VAC) is calculated by dividing the charging-allowable power PEV by the power source voltage VAC of the external power source 11.

Furthermore, in the step S09, demand for power (predicted value of demand for power) which is predicted on or after the present time is obtained.

After that, in step S10, the information of the charging current ICHG is transmitted to the charging cable 12 through the power line communication (PLC) signal, the information of the charging-allowable power PEV is transmitted to the charging cable 12 through the power line communication (PLC) signal, the information of the predicted value of demand for power is transmitted to the charging cable 12 through the power line communication (PLC) signal, the present time t0 is transmitted through the power line communication (PLC) signal, and the process ends.

Hereinafter, an operation of the CPU 34 of the charging cable 12 after the external power source 11 is connected to the vehicle 14 by use of the charging cable 12 will be described.

Figure 4:
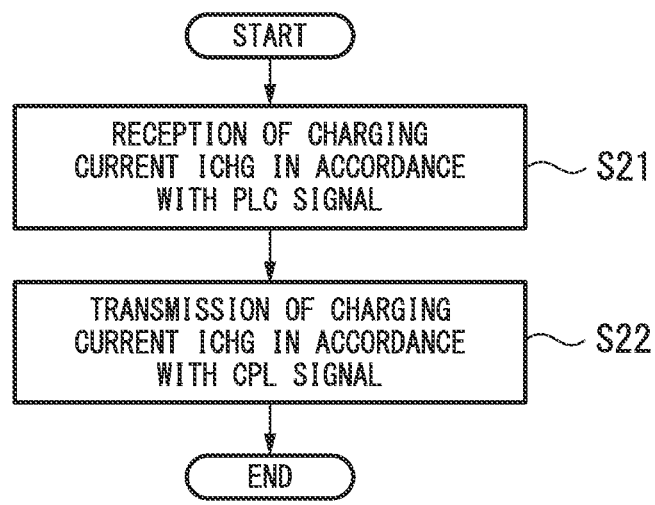
FIG. 4 is a flowchart illustrating an operation of the charging cable of the vehicle charging system related to the embodiment of the invention.

Firstly, for example, in step S21 as shown in FIG. 4, the information of the charging current ICHG is received by the power line communication (PLC) signal.

Next, in step S22, the information of the charging current ICHG is transmitted through the CPL signal (oscillated signal) to the BATECU 53 of the vehicle 14, and the process ends.

Hereinafter, an operation of the BATECU 53 of the vehicle 14 after the external power source 11 is connected to the vehicle 14 by use of the charging cable 12 will be described.

Figure 5:
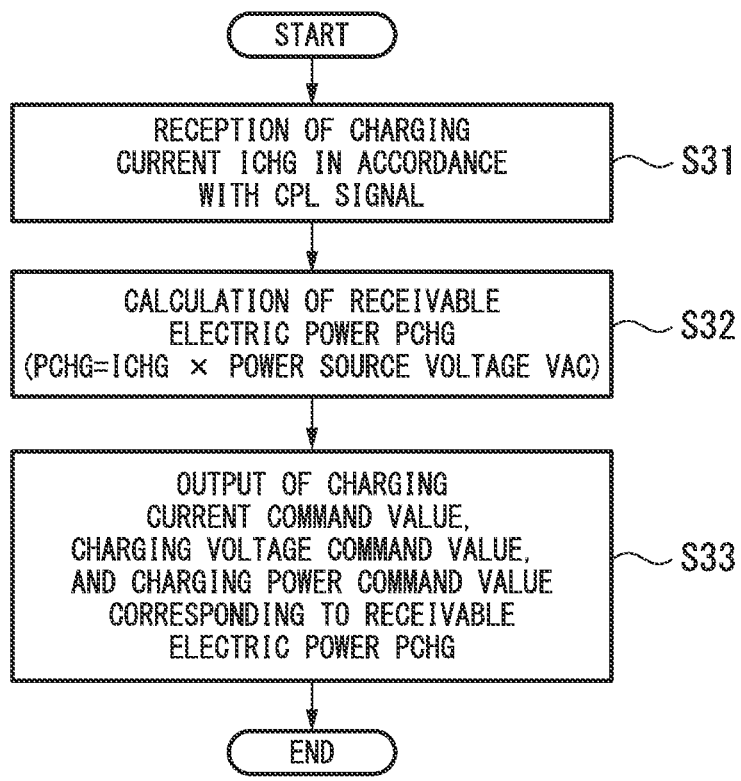
FIG. 5 is a flowchart illustrating an operation of a vehicle of the vehicle charging system related to the embodiment of the invention.

First of all, for example, in step S31 as shown in FIG. 5, the information of the charging current ICHG is received by the CPL signal (oscillated signal).

After that, in step S32, a receivable electric power PCHG (=ICHG×VAC) is calculated by multiplying the charging current ICHG by the power source voltage VAC of the external power source 11.

Subsequently, in step S33, a charging current command value, a charging voltage command value, and a charging power command value are output in accordance with the receivable electric power PCHG, the charging of the battery charger 52 is controlled, and the process ends.

Hereinafter, a displaying operation a variety of information by the CPU 34 of the charging cable 12, for example, the maximum charging power PCHGM and the maximum charging electrical current ICHGM after the external power source 11 is connected to the vehicle 14 by use of the charging cable 12 will be described.

Figure 6:
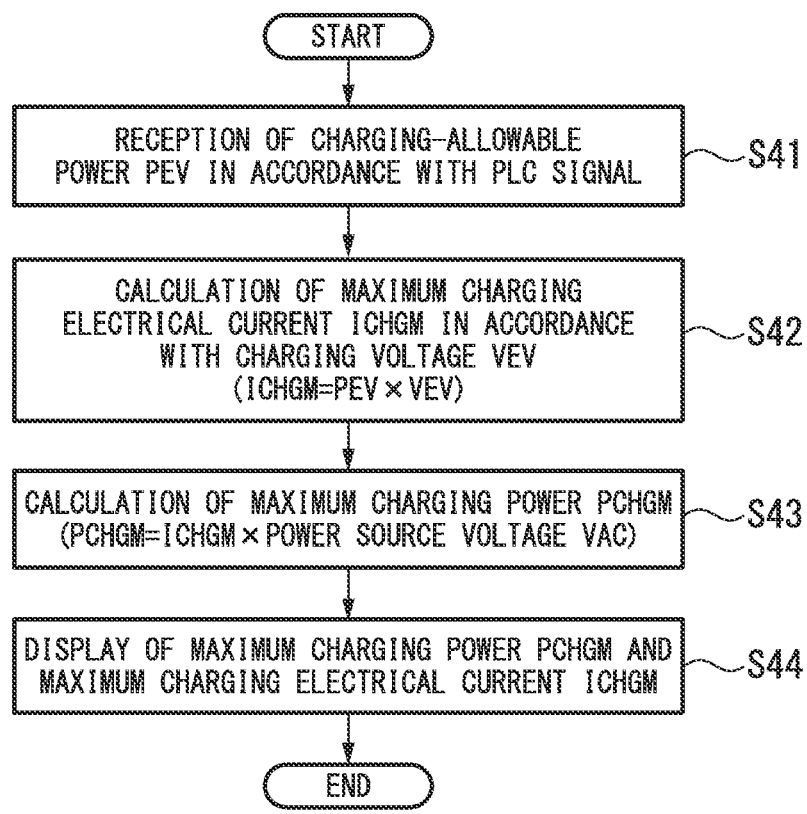
FIG. 6 is a flowchart illustrating an operation of the charging cable of the vehicle charging system related to the embodiment of the invention, particularly, illustrating a process of displaying maximum charging electrical current.

Firstly, for example, in step S41 as shown in FIG. 6, the information of the charging-allowable power PEV is received by the power line communication (PLC) signal.

After that, in step S42, the maximum charging electrical current ICHGM (=PEV/VEV) is calculated by dividing the charging-allowable power PEV by the charging voltage VEV which is applied to the vehicle-side plug 32.

Subsequently, in step S43, the maximum charging power PCHGM (=ICHGM×VAC) is calculated by multiplying the maximum charging electrical current ICHGM and the power source voltage VAC of the external power source 11.

Next, in step S44, the maximum charging power PCHGM and the maximum charging electrical current ICHGM are displayed on the display unit 41, and the process ends.

Hereinafter, a variety of information by the CPU 34 of the charging cable 12, for example, a displaying operation of the charge completion time TE after the external power source 11 is connected to the vehicle 14 by use of the charging cable 12 will be described.

Figure 7:
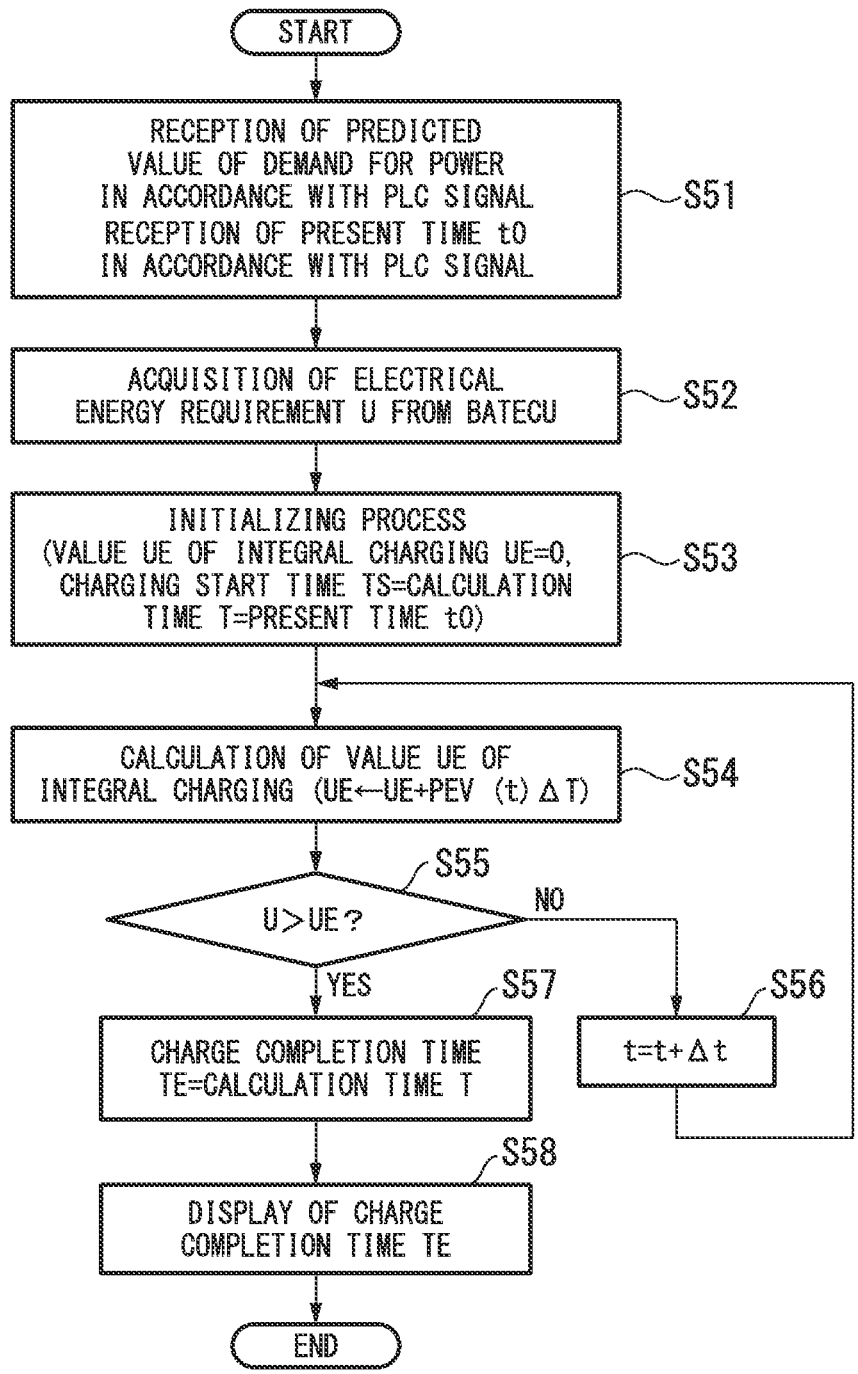
FIG. 7 is a flowchart illustrating an operation of the charging cable of the vehicle charging system related to the embodiment of the invention, particularly, illustrating a process of displaying charge completion time.

First of all, for example, in step S51 as shown in FIG. 7, information of the predicted value of demand for power is received by the power line communication (PLC) signal, and present time t0 is received by the power line communication (PLC) signal.

Subsequently, in step S52, information of the electrical energy requirement U, which is required for charging the battery 13 until a charging state of the battery 13 becomes a predetermined charging state (for example, full charge state or the like), is obtained from the BATECU 53.

After that, in step S53, an initializing process is executed, a value UE of integral charging is set to zero, a charging start time TS and a calculation time t are set to the present time t0.

Next, in step S54, the value, which is obtained by adding the value UE of integral charging at this time to the value (=PEV (t)×Δt) obtained by multiplying the charging-allowable power PEV (t) at the calculation time t by a predetermined divided time Δt, is freshly set as a value UE of integral charging.

Subsequently, in step S55, it is determined as to whether or not the electrical energy requirement U is greater than the value UE of integral charging.

If the determined result is "NO", the process proceeds to step S56. In the step S56, the value which is obtained by adding the divided time Δt to the calculation time t is freshly set as the calculation time t, and the process returns to the above-described step S54.

On the other hand, if the determined result is "YES", the process proceeds to step S57.

Consequently, in step S57, the calculation time t is set to the charge completion time TE.

Next, in step S58, the charge completion time TE is displayed on the display unit 41, and the process ends.

Figure 8:
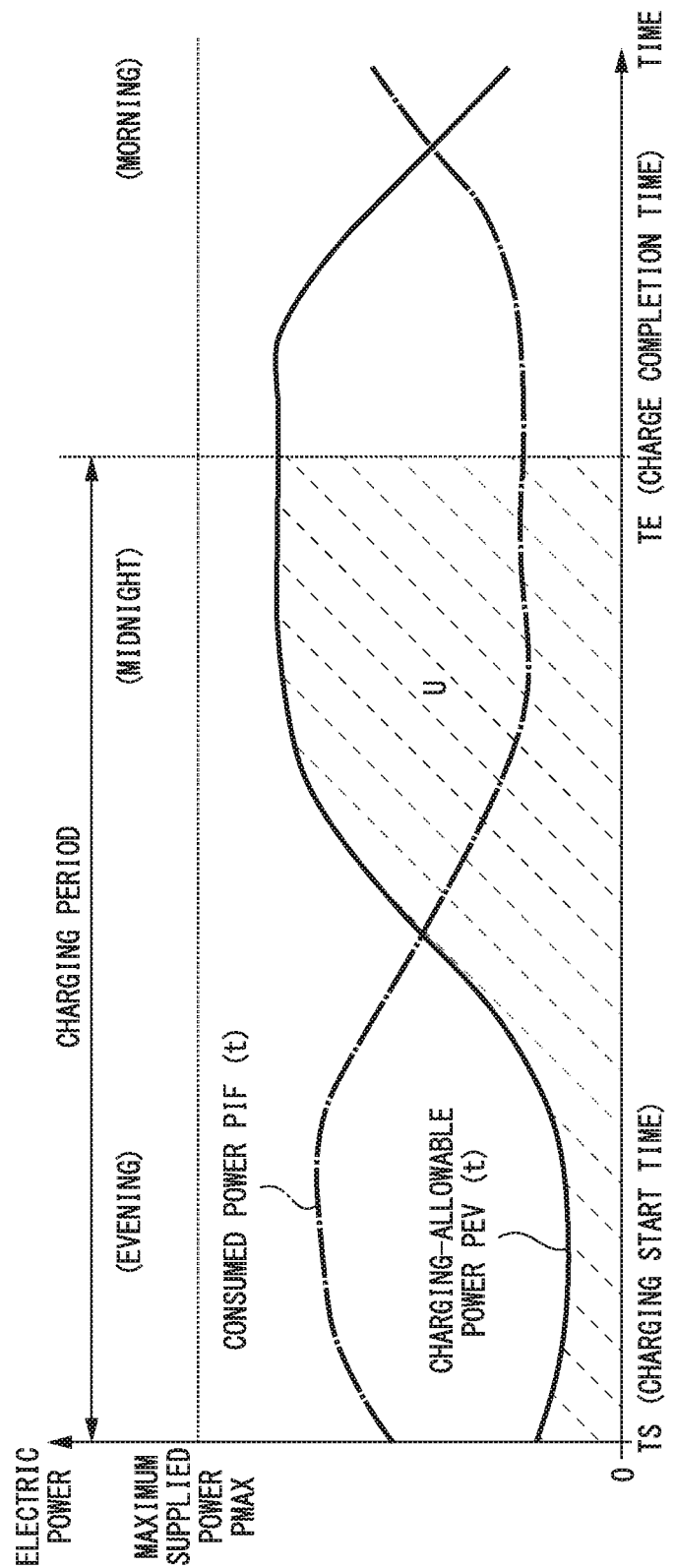
FIG. 8 is a chart illustrating an example of time change in consumed power and charging-allowable power in a power source for use by the household which is an external power source related to the embodiment of the invention.

Additionally, the information of the predicted value of demand for power is information representing time variation in the consumed power PIF and the charging-allowable power PEV in the external power source 11 in the future as shown in, for example, FIG. 8.

Moreover, the time, at which the value UE of integral charging obtained by temporal-integrating the charging-allowable power PEV from the charging start time TS reaches the electrical energy requirement U, is the charge completion time TE.

Furthermore, the period between the charging start time TS and the charge completion time TE is a charging period in which the charging is continued.

Additionally, the charge completion time TE is updated every predetermined period of time.

As described above, according to the vehicle charging system 10 of the embodiment, the PLC communication unit 33 of the charging cable 12 can communicate to the PLC communication unit 24 of the external power source 11 through the power line communication.

In addition, cost necessary for device constitution is reduced without the need for special communication lines used for communication, and it is possible to reduce the weight of device.

Furthermore, compared with, for example, the constitution which can perform radio communication, it is necessary to provide transmitting and receiving antennae, and it is possible to reduce noises.

Consequently, since the CPU 34 of the charging cable 12 supplies the electric power to the battery 13 of the vehicle 14 based on the information (e.g., charging current ICHG) associated with the charging-allowable power PEV obtained from the external power source 11 by the power line communication, it is possible to perform suitable charging.

Particularly, the CPU 34 of the charging cable 12 extracts the power which is charged to the battery 13 of the vehicle 14 from the external power source 11 in the power range which is less than or equal to the charging-allowable power PEV obtained from the external power source 11.

Because of this, for example, even where the consumed power PIF in the external power source 11 increases and the charging-allowable power PEV decreases, it is possible to prevent the external power source 11 from extracting excessive electric power exceeding the charging-allowable power which can be supplied by the external power source 11 as being charged to the battery 13.

As a result, it is possible to prevent the current limiter 21 of the external power source 11 from being operated when charging the battery 13.

Furthermore, it is possible to improve a degree of calculation precision of the maximum charging power PCHGM, the maximum charging electrical current ICHGM, and the charge completion time TE based on information of the charging-allowable power PEV obtained from the external power source 11, and it is possible to improve usability therefor.

INDUSTRIAL APPLICABILITY

The present invention is applicable to a vehicle charging system which can adequately charge a battery of a vehicle in accordance with electric power which can be supplied by the external power source.

What is claimed is:

1. A vehicle charging system comprising:

a vehicle comprising a charging control unit controlling a battery and charge of the battery;

an external power source provided outside the vehicle;

a charging cable comprising an electric power line and a first communication control unit, the electric power line connecting the external power source to the vehicle such that the external power source and the vehicle transmit and receive electric power, the first communication control unit being connected to the electric power line;

an external power source line provided at the external power source and being connectable to the electric power line of the charging cable;

a second communication control unit provided at the external power source and connected to the external power source line, being capable of communicating with the first communication control unit due to power line communication through the electric power line and the external power source line;

a consumed power acquiring unit provided at the external power source, acquiring consumed power to be consumed in the external power source other than the charge of the battery of the vehicle;

a charging-allowable power calculating unit provided at the external power source, the external power source being capable of supplying maximum supplied power, the charging-allowable power calculating unit calculating charging-allowable power obtained by subtracting the consumed power from the maximum supplied power;

a transmitting unit provided at the charging cable, transmitting information associated with the charging-allowable power, the information being received by the first communication control unit to the charging control unit of the vehicle; and a control unit provided at the charging cable, supplying electric power from the external power source to the battery of the vehicle based on the information associated with the charging-allowable power, the information being received by the first communication control unit, wherein the second communication control unit transmits the first communication control unit information associated with the charging-allowable power through the power line communication, and the first communication control unit receives information which is associated with the charging-allowable power and transmitted from the second communication control unit.

* * * * *